(12) United States Patent
Aso et al.

(10) Patent No.: US 8,650,978 B2
(45) Date of Patent: Feb. 18, 2014

(54) LINEAR ACTUATOR PROVIDED WITH DUST-PROOF MECHANISM

(75) Inventors: Toshiyuki Aso, Shinagawa-ku (JP); Toshiya Tanaka, Shinagawa-ku (JP); Toshiaki Mizuno, Shinagawa-ku (JP); Norinobu Ogawa, Nerima-ku (JP); Minoru Tsukada, Nerima-ku (JP); Yukitoshi Kobayashi, Nerima-ku (JP)

(73) Assignee: THK Co., Ltd., Tokyo (JP)

( * ) Notice: Subject to any disclaimer, the term of this patent is extended or adjusted under 35 U.S.C. 154(b) by 26 days.

(21) Appl. No.: 13/522,263

(22) PCT Filed: Dec. 7, 2010

(86) PCT No.: PCT/JP2010/071904
§ 371 (c)(1),
(2), (4) Date: Jul. 13, 2012

(87) PCT Pub. No.: WO2011/086791
PCT Pub. Date: Jul. 21, 2011

(65) Prior Publication Data
US 2013/0147286 A1  Jun. 13, 2013

(30) Foreign Application Priority Data

Jan. 15, 2010  (JP) ................................. 2010-007050

(51) Int. Cl.
*F16H 27/02* (2006.01)
(52) U.S. Cl.
USPC ........................................ 74/89.41; 74/89.34
(58) Field of Classification Search
USPC ............... 74/89.23, 89.33, 89.34, 89.4, 89.41
See application file for complete search history.

(56) References Cited

U.S. PATENT DOCUMENTS 3,630,328 A * 12/1971 Nelson ........................... 192/223
3,831,456 A *  8/1974 Jahnke ............................ 74/110
(Continued)

FOREIGN PATENT DOCUMENTS

DE  9211093 U1  10/1992
EP  1229578 A1   8/2002
(Continued)

OTHER PUBLICATIONS

German Office Action issued Dec. 24, 2012 in corresponding German Application No. 112010005138.0.

*Primary Examiner* — David M Fenstermacher
(74) *Attorney, Agent, or Firm* — Sughrue Mion, PLLC

(57) ABSTRACT

There is provided a linear actuator provided with a dust-proof mechanism capable of preventing dust-proof belts from being deformed, improving a sealing performance between the dust-proof belts and a housing member, and achieving high dust-proof performance irrespective of a size of the linear actuator. The linear actuator provided with the dust-proof mechanism includes: a housing member disposed so as to cover at least a ball screw; an opening portion formed in the housing member so as to extend along a moving locus of a movable stage; and dust-proof belts stretched inside the housing member so as to close the opening portion by being mounted to mounting members disposed both end portions of the housing member, wherein a bypass member for bypassing the dust-proof belts positioned at position overlapped with the movable stage is provided for the movable stage so as to realize movement of the movable member along the opening portion while closing and sealing the opening portion by the dust-proof belts, and in such a linear actuator provided with the dust-proof mechanism, the dust-proof belts are wound up around the mounting member and sandwiched between the mounting member and the end portions of the housing member.

8 Claims, 10 Drawing Sheets

(56) References Cited

U.S. PATENT DOCUMENTS

| | | | |
|---|---|---|---|
| 4,569,239 A * | 2/1986 | Shirley et al. | 74/89.34 |
| 4,712,441 A * | 12/1987 | Abraham | 74/89.38 |
| 4,773,497 A * | 9/1988 | Carlson et al. | 180/444 |
| 5,761,960 A * | 6/1998 | Nagai et al. | 74/89.33 |
| 5,809,833 A * | 9/1998 | Newport et al. | 74/89.37 |
| 8,272,286 B2 * | 9/2012 | Aso et al. | 74/89.4 |
| 8,302,498 B2 * | 11/2012 | Shirai et al. | 74/89.4 |
| 2010/0206102 A1 | 8/2010 | Aso et al. | |

FOREIGN PATENT DOCUMENTS

| | | |
|---|---|---|
| JP | 48-43958 Y1 | 12/1973 |
| JP | 63-172545 U | 11/1988 |
| JP | 3-33041 U | 4/1991 |
| JP | 4-189496 A | 7/1992 |
| JP | 5-63764 U | 8/1993 |
| JP | 6-82433 A | 11/1994 |
| JP | 8-279545 A | 10/1996 |
| JP | 2000-266151 A | 9/2000 |
| WO | 2009/034804 A1 | 3/2009 |

* cited by examiner

FIG. 6
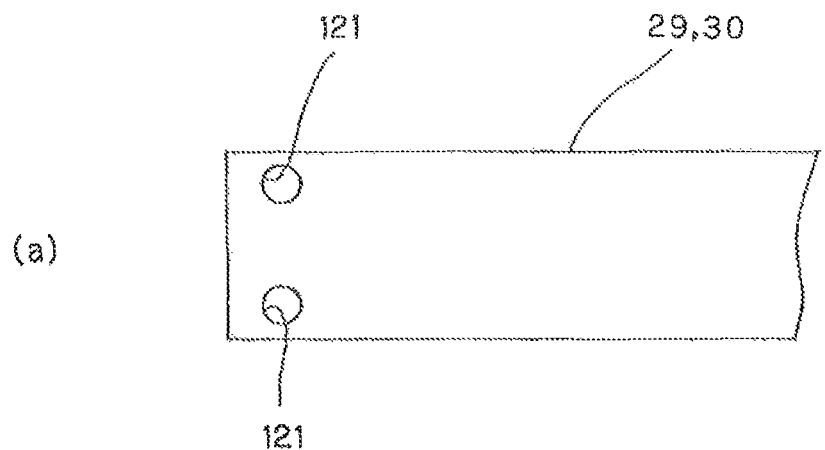
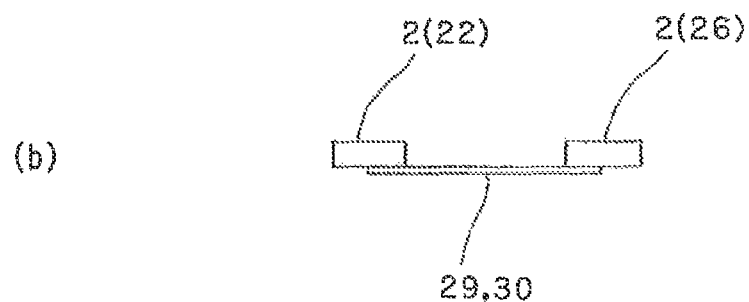

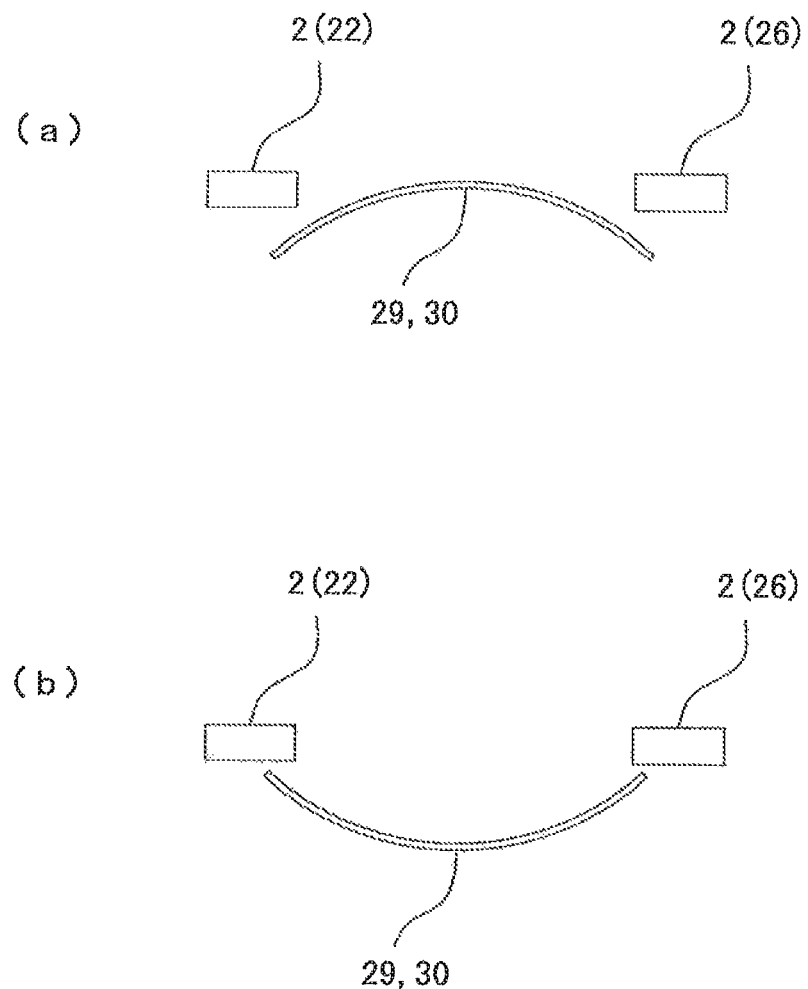

LINEAR ACTUATOR PROVIDED WITH DUST-PROOF MECHANISM

CROSS REFERENCE TO RELATED APPLICATIONS

This application is a National Stage of International Application No. PCT/JP2010/071904 filed Dec. 7, 2010, claiming priority based on Japanese Patent Application No. 2010-007050 filed Jan. 15, 2010, the contents of all of which are incorporated herein by reference in their entirety.

TECHNICAL FIELD

The present invention relates to a linear actuator provided with a dust-proof mechanism, and particularly, to a linear actuator provided with a dust-proof mechanism usable in, for example, a clean room.

BACKGROUND ART

Heretofore, the present applicant and related corporations associated therewith have been provided various-types of actuators provided with dust-proof mechanisms or like such as disclosed in the following Patent Document 1 (which include motion guide devices for guiding motions of objects to be moved. For example, a leaner actuator provided with a dust-proof mechanism provided in the Patent Document 1 is provided with a function to surely prevent dust or like from leaking through an opening formed in an actuator housing, and in order to avoid interference between a dust-proof belt and a projected portion of a moving stage at the opening of the actuator housing, by-pass or detour means of the dust-proof belt with respect to the moving stage is specifically provided.

The linear actuator provided with the dust-proof mechanism disclosed in the Patent Document 1 will be explained hereunder with reference to FIG. 10. It is further to be noted that FIG. 10 is a view for explaining structure of a linear actuator provided with a dust-proof mechanism according to a conventional technology, in which (a) illustrates an upper surface side of the linear actuator provided with the dust-proof mechanism, (b) illustrates a front surface side thereof, and (c) illustrates a sectional view of the linear actuator provided with the dust-proof mechanism.

As shown in FIG. 10, the linear actuator 1 provided with a dust-proof mechanism according to the conventional art includes a slender (long and thin) box-shaped housing member 2, a ball screw 3 supported within the box-shaped housing member 2 in a state of being rotatable, a movable stage capable of reciprocally linearly moving in response to the rotational motion of the ball screw 3, and a drive motor 5 for driving and rotating the ball screw 3.

The housing member 2 is provided with a horizontal substrate 21, a pair of lateral vertical side plates 22 and 23 vertically standing from the horizontal substrate 21 and extending in parallel with the ball screw 3, and end blocks 24 and 25 mounted to front and rear end portions of the vertical side plates 22 and 23, respectively. One end of the ball screw 3 is supported by one of the end blocks 24 to be rotatable, and the other end of the ball screw 3 is also supported by the other one of the end blocks 25 to be rotatable in a manner of penetrating the end block 25 and being coupled with a drive motor 5 side.

The lateral vertical side plates 22 and 23 have upper end portions which are bent toward inside at right angle as horizontal upper plate portions 22a and 23a. A central partitioning (sectioning) plate 26 is disposed at an intermediate portion between the lateral horizontal upper plate portions 22a and 23a, and front and rear end portions of the central partitioning plate 26 are mounted and fixed to the end blocks 24 and 25, respectively. As a result of such arrangement, a left side opening 27 is formed between the horizontal upper plate portion 22a and the central partitioning plate 26 so as to extend in an axial direction of the ball screw 3, i.e., moving direction of the movable state 4. Likely, a right side opening 28 is formed between the horizontal upper plate 23a and the central partitioning plate 26.

The respective openings 27 and 28 are closed and sealed off by dust-proof belts 29 and 30 each having a width larger than a width of each opening. The dust-proof belts 29 and 30 are stretched between the end blocks 24 and 25 along the loser surface sides of the horizontal upper plate portions 22, 23 and the central partitioning plate 26.

As described above, the housing member 2 constitutes a compartment sectioned in shape of box by the horizontal substrate 21, the vertical side plates 22, 23 (i.e., horizontal upper plate portions 22a, 23a), the central partitioning plate 26, the end blocks 24, 25, and the dust-proof belts 29, 30 closing and sealing off the openings 27, 28 so as to cover the ball screw 3 to thereby achieve a function of holding dust generated from the actuator inside the sectioned compartment.

The movable stage 4 is provided with a nut block 41 to which a ball screw nut screwed with the ball screw 3 is formed, a lower plate 42 fixed to the upper surface of the nut block 41, an intermediate plate 43 fixed to the upper surface of the lower plate 42, and an upper plate 44 fixed to the upper surface of the intermediate plate 43. Both side surfaces of the nut block 41 are supported to be slidable in the axial direction of the ball screw 3 by a linear guide rail 31 mounted inside the housing member 2.

The movable stage 4 has a structure in which the upper plate 44 is positioned on the outer side of the hosing member 2, and the intermediate plate 43, the lower plate 42 and the nut block 41 are positioned inside the housing member 2. That is, the upper plate 44 projects outward from the openings 27 and 28, and when the upper plate 44 is connected to an object to be guided, a moving force is applied to the object to be guided.

In addition, rollers 61 to 66 protruded horizontally from the lateral (right and left) side surfaces positioned inside the housing member 2 in the movable stage 4 are provided as bypass means for bypassing the dust-proof belts 29 and 30 in a state of being rotatable. These rollers 61 to 66 are arranged in a manner such that the centrally arranged rollers 63 and 64 are positioned lower than the rollers 61, 62, 65 and 66 disposed both the end sides in the axial direction (further, it is to be noted that although the roller 65 is arranged at a position opposing to the roller 66, the roller 65 does not appear on FIG. 10, and hence, the roller 65 will be described hereinafter as roller (65)).

The respective dust-proof belts 29 and 30 are stretched over the respective rollers 61 to 66 so as to prevent interference of the upper plate 44 projecting outward from the openings 27 and 28 with the dust-proof belts 29 and 30. That is, the dust-proof belts 29 and 30 are stretched over the respective rollers 61 to 66 so as to bypass below the projected portion of the upper plate 44, and more specifically, the left side (upper side on the drawing paper in FIG. 10(a)) dust-proof belt 29 passes above the front side roller 61, is stretched around the lower side of the central roller 63, and then passes above the rear side roller (65). In the like manner as to the right side (lower side on the drawing paper in FIG. 10(a)) dust-proof belt 30 passes above the front side roller 62, is stretched around the lower side of the central roller 63 and then passes above the rear side roller 66.

Since the linear actuator 1 provided with the dust-proof mechanism according to the conventional art has such structure as mentioned above, the openings 27 and 28 formed along the movement locus of the movable stage 4, can always maintain the closed and sealed state by the dust-proof belt 29 and 30. Accordingly, dust generated at or from the sliding portion between the ball screw 3 and the ball screw nut provided for the nut block 41 and the sliding portion between the nut block 41 and the linear guide rail 31 can be prevented from leaking outward through the openings 27 and 28 formed to the housing member 2.

Furthermore, in the linear actuator 1 provided with the dust-proof mechanism according to the conventional art, the dust-proof belts 29 and 30 are arranged inside the housing member 2 so as to be capable of bypassing or detouring below the movable stage 4 which moves along the openings 27 and 28, and accordingly, when the movable stage 4 moves, the closed and sealed state of the openings 27 and 28 by the dust-proof belts 29 and 30 can be always maintained.

PRIOR ART DOCUMENT

Patent Document 1: Japanese Patent Laid-open Publication No. 2000-266151.

DISCLOSURE OF THE INVENTION

Problems to be Solved by the Invention

However, as shown in FIG. 11, the dust-proof belts 29 and 30 are fixed to the upper surfaces of the end blocks 24 and 25 through plates 70 and 70, respectively, by means of bolts with a predetermined tension applied to the belts 29 and 30 so as not to be loosened. According to such conventional structure, it is difficult to evenly apply the tension to both the dust-proof belts 29 and 30 in their width directions, and in accordance with difference in largeness of the tension applied to the width direction of each dust-proof belt, there is a possibility of bending the dust-proof belts 29 and 30 in the vertical direction and hence lowering sealing performance between the housing member 2 and the dust-proof belts 29 and 30.

In addition, in research or experiment of inventors of the subject application, it has been found that in a case where the dust-proof belts 29 and 30 have a small width dimension (length or size), the dust-proof belts 29 and 30 are bent in an upward bow-shape as illustrated in FIG. 12(a), and in a case where the dust-proof belts 29 and 30 have a large width dimension, (approximately more than 50 mm), the dust-proof belts 29 and 30 are bent in a downward bow-shape as illustrated in FIG. 12(b).

As mentioned above, according to the structure of the conventional linear actuator provided with the dust-proof mechanism, there was caused such an undesirable case as that when it is required to adjust tension which is to be applied to the dust-proof belts is applied for suitably mounting the dust-proof belts and widely changing the size of the linear actuator provided with the dust-proof mechanism, the dust-proof belts 29 and 30 are bent and the belt mounting state is changed, which results in difficulty in adjustment of the mounting state of the dust-proof belts 29 and 30 according to the bent state thereof, thus being defective.

Accordingly, the present invention was made to solve the above defect and an object thereof is to provide a linear actuator provided with a dust-proof mechanism capable of preventing a dust-proof belt from being bent, improving sealing performance between the dust-proof belt and a housing member and achieving high dust-proof performance even in a case when a linear actuator has any size and dimension.

Means for Solving the Problems

A linear actuator provided with a dust-proof mechanism according to the present invention provided for solving the above problem includes: a ball screw; a movable stage provided with a ball screw nut engaged with the ball screw and configured to be reciprocally movable in an axial direction of the ball screw in accordance with a rotational motion of the ball screw; a housing member disposed so as to cover at least the ball screw; an opening portion formed in the housing member so as to extend along a moving locus of the movable stage; and dust-proof belts stretched inside the housing member so as to close the opening portion by being mounted to mounting members disposed both end portions of the housing member, wherein a bypass member for bypassing the dust-proof belts positioned at position overlapped with the movable stage is provided for the movable stage so as to realize movement of the movable member along the opening portion while closing and sealing the opening portion by the dust-proof belts, and the dust-proof belts are wound up around the mounting member and sandwiched between the mounting member and the end portions of the housing member.

Effects of the Invention

According to the present invention, since the dust-proof belts are wound up around the mounting member and sandwiched between the mounting member and the end portions of the housing member, tension can be applied evenly and strongly in the width direction of the dust-proof belts, and in addition, the fixing stress of the dust-proof belts can be received by the abutting surface between the housing member and the mounting member, so that the deformation of the dust-proof belts can be prevented and the sealing performance can be improved.

BRIEF DESCRIPTION OF THE DRAWINGS

FIG. 6 represents a structure of the dust-proof belt of the linear actuator provided with the dust-proof mechanism according to the first embodiment, in which (a) is a view explaining a position of a mount hole formed to the dust-proof belt, and (b) is a sectional view showing a mounting method of the dust-proof belt.

FIG. 12 is a sectional view representing a mounting condition of the dust-proof belt of the linear actuator provided with the dust-proof mechanism according to the conventional technology, in which (a) shows the dust-proof belt loosened in an upward bent bow-shape, and (b) shows the dust-proof belt loosened in a downward bent bow-shape.

MODE FOR CARRYING OUT THE INVENTION

Figure 1:
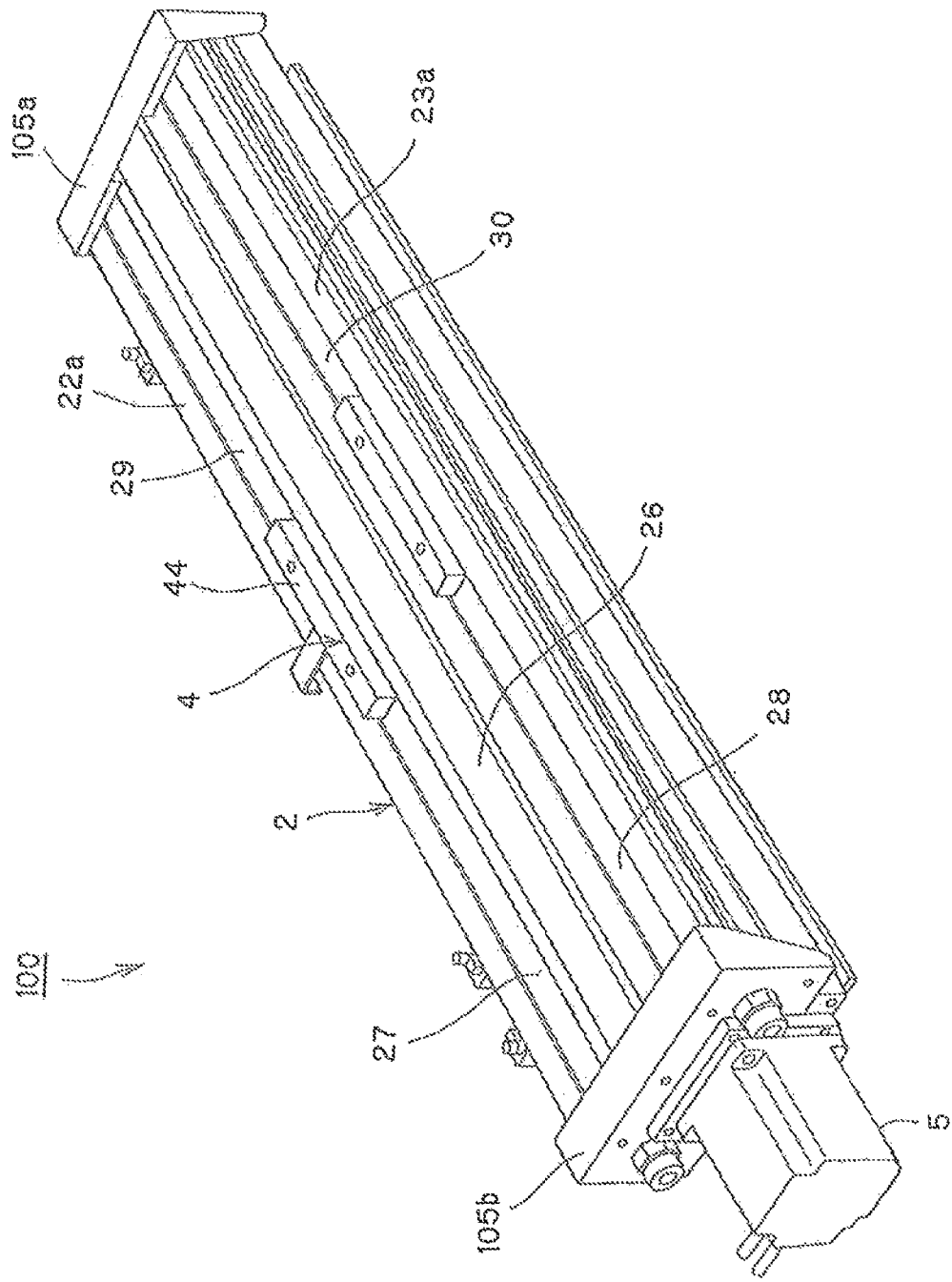
FIG. 1 is a perspective view showing an outer appearance of a linear actuator provided with a dust-proof mechanism according to a first embodiment of the present invention.

Hereunder, preferred embodiments for carrying out the present invention will be described with reference to the accompanying drawings. It is further to be noted that all the combination of subject features explained in the embodiments is not always essential for the solution of the solving means of the present invention. Furthermore, the reference numerals added to members explained in the Background Technology are also added to the same or similar members mentioned in the following embodiments, and duplicated description thereof will be hence omitted herein.

First Embodiment

Figure 2:
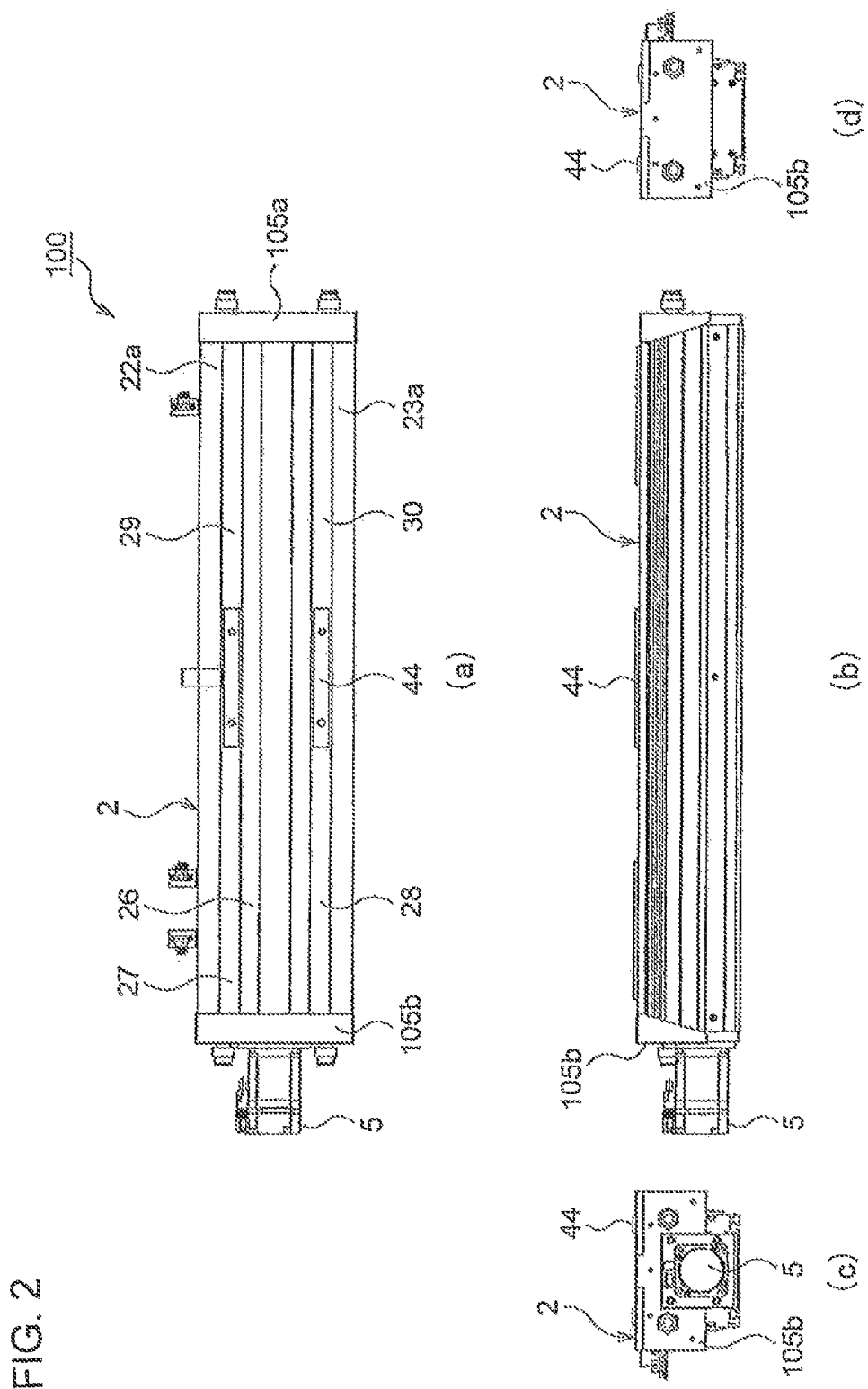
FIG. 2 represents a view for explaining a structure of the outer appearance of the linear actuator provided with the dust-proof mechanism according to the first embodiment, in which (a) shows an upper surface side of the linear actuator, (b) shows a front surface side thereof, (c) shows a side surface of a motor side thereof, and (d) is a side surface of a side opposite to the motor side.
Figure 3:
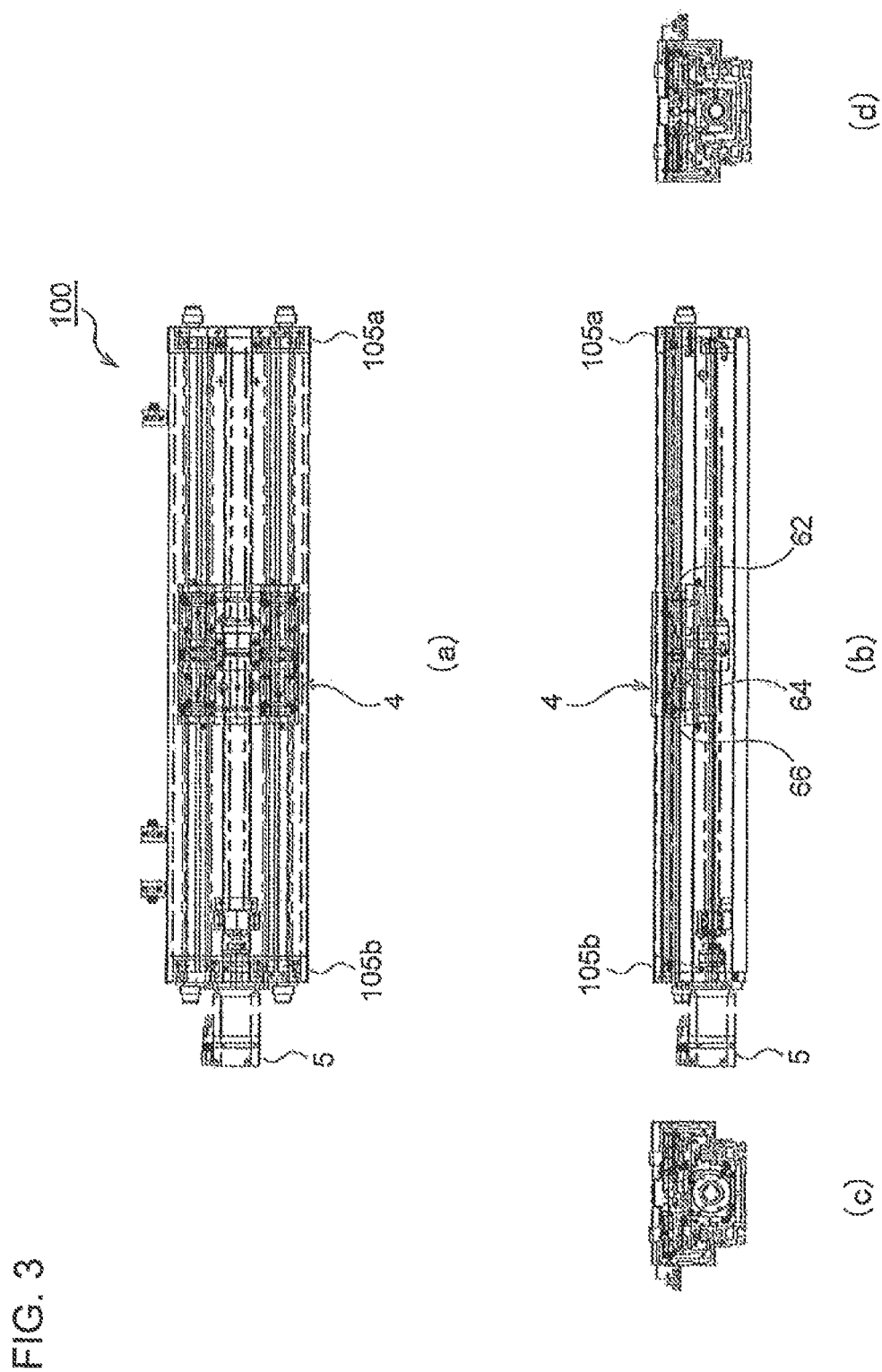
FIG. 3 represents a view for explaining an inner structure of the linear actuator provided with the dust-proof mechanism according to the first embodiment, in which (a) is a view seen from an upper side of the linear actuator, (b) is a view seen from a front side thereof, (c) shows a side surface of a motor side thereof, and (d) is a side surface of a side opposite to the motor side.
Figure 4:
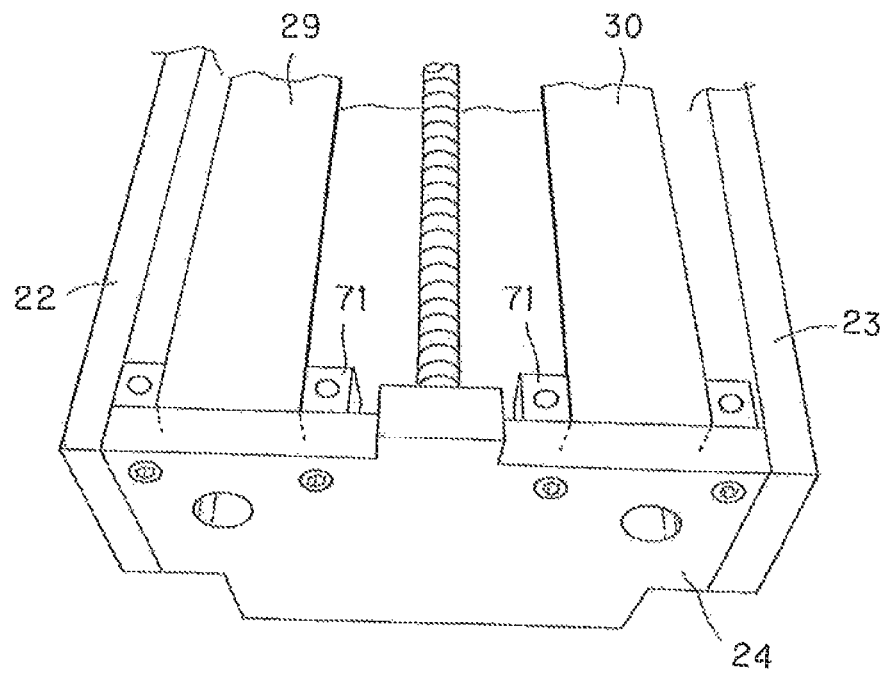
FIG. 4 is a perspective view illustrating an upper surface of a part of the linear actuator for explaining a mounting method of a dust-proof mechanism of the linear actuator according to the first embodiment.
Figure 5:
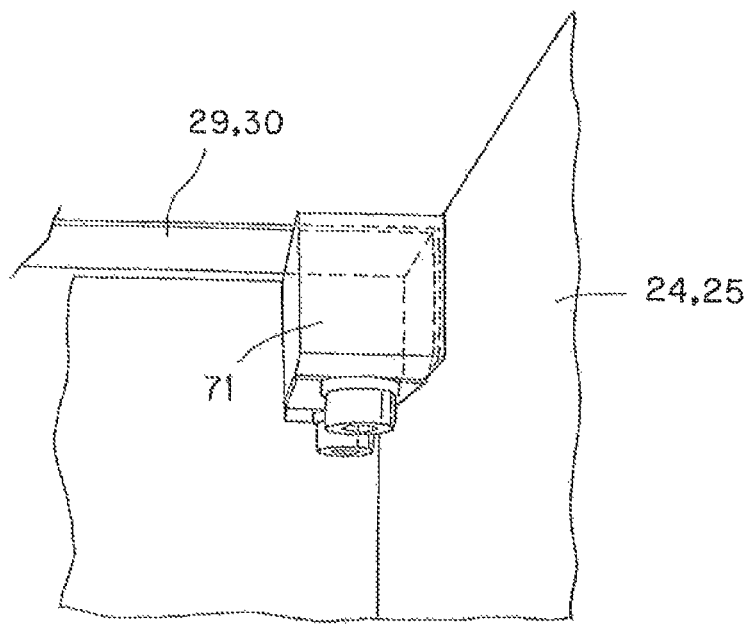
FIG. 5 is a view for explaining a mounting method of the dust-proof belt of the linear actuator provided with the dust-proof mechanism according to the first embodiment.

With reference to FIGS. 1 to 6, a linear actuator 100 provided with a dust-proof mechanism according to a first embodiment will be explained, in which: FIG. 1 is a perspective view showing an outer appearance of a linear actuator provided with a dust-proof mechanism according to a first embodiment of the present invention; FIG. 2 represents a view for explaining a structure of the outer appearance of the linear actuator provided with the dust-proof mechanism according to the first embodiment, in which (a) shows an upper surface side of the linear actuator, (b) shows a front surface side thereof, (c) shows a side surface of a motor side thereof, and (d) is a side surface of a side opposite to the motor side; FIG. 3 represents a view for explaining an inner structure of the linear actuator provided with the dust-proof mechanism according to the first embodiment, in which (a) is a view seen from an upper side of the linear actuator, (b) is a view seen from a front side thereof, (c) shows a side surface of a motor side thereof, and (d) is a side surface of a side opposite to the motor side; FIG. 4 is a perspective view illustrating an upper surface of a part of the linear actuator for explaining a mounting method of a dust-proof mechanism of the linear actuator according to the first embodiment; FIG. 5 is a view for explaining a mounting method of the dust-proof belt of the linear actuator provided with the dust-proof mechanism according to the first embodiment; and FIG. 6 represents a structure of the dust-proof belt of the linear actuator provided with the dust-proof mechanism according to the first embodiment, in which (a) is a view for explaining a position of a mount hole formed to the dust-proof belt, and (b) is a sectional view showing a mounting method of the dust-proof belt.

The linear actuator 100 provided with the dust-proof mechanism according to the first embodiment has a structure substantially the same as the conventional linear actuator 1 provided with a dust-proof mechanism. However, in order to further improve the dust-proof function, end plate covers 105a and 105b covering both end portions of the housing member 2 are provided as shown in FIGS. 1 to 3.

The subject feature of the linear actuator 100 provided with the dust-proof mechanism according to the present embodiment resides in a mounting method for dust-proof belts 29 and 30, which will be explained in detail with reference to FIGS. 4 to 6.

Hereunder, although a shape and a mounting method of a mounting member 71 mounted to an end block 24 on a side opposite to a motor side will be explained specifically as an example, another end block 25 on the motor side has also substantially the same structure of the end block 24, and accordingly, on this side, the same reference numerals are added and explanation thereof is omitted herein.

As shown in FIGS. 4 and 5, the dust-proof belts 29 and 30 of the linear actuator provided with the dust-proof mechanism of the present embodiment are wound up around the mounting members 71 having block-shaped end portions and are mounted by being sandwiched between the mounting members 71 and end blocks 24 and 25, respectively.

The mounting members 71 and the end block 24 of the housing member 2 are mounted such that the upper surfaces thereof are positioned on the same surface level, and the dust-proof belts 29 and 30 are mounted in a surface-contact manner to the upper surface of the mounting members 71 and the side surface opposing to the end block 24. Furthermore, the dust-proof belts 29 and 30 are also mounted to the mounting members 71 by screwing bolts with bolt holes perforated in the lower surfaces of the mounting members 71.

As mentioned above, the dust-proof belts 29 and 30 are wound up around the mounting members 71 by ¾ circle of one turn along the upper surface and side surface opposing to the end block 24.

Furthermore, as shown in FIG. 6, the dust-proof belts 29 and 30 are mounted to the mounting members 71 through mounting holes 121 formed to positions near both end sides in the width direction of the dust-proof belts 29 and 30. As mentioned above, by forming the mounting holes 121 on both end side portions of the dust-proof belts 29 and 30, sufficient tension can be applied to both the end portions thereof when the dust-proof belts 29 and 30 are stretched between both the end blocks 24 and 25.

Still furthermore, the linear actuator 100 provided with the dust-proof mechanism according to the present embodiment has the structure in which the dust-proof belts 29 and 30 are wound up around the mounting members 71 in a manner sandwiched between the mounting members 71 and the end blocks 24 and 25 of the housing member 2, and accordingly, the dust-proof belts 29a and 30 are applied with tension by the abutting surfaces between the mounting members 71 and the end blocks 24 and 25. According to such structure, the dust-proof belts 29 and 30 can be pulled evenly and strongly along the entire width direction thereof. Thus, as shown in FIG. 6(b), the dust-proof belts 29 and 30 can be stretched horizontally along the longitudinal direction of the housing member 2, and hence, a gap between the dust-proof belts 29, 30 and the housing member 2 can be tightly closed to thereby surely improve the sealing performance of the linear actuator 100 provided with the dust-proof mechanism.

Second Embodiment

The linear actuator 100 provided with the dust-proof mechanism according to the first embodiment was explained hereinabove. A second embodiment, which will be described hereunder, is an embodiment of a linear actuator provided with a dust-proof mechanism having a shape different from the linear actuator provided with the dust-proof mechanism according to the first embodiment. Further, the same or like members as those in the first embodiment are added with the same reference numerals and description thereof will be omitted herein.

Figure 7:
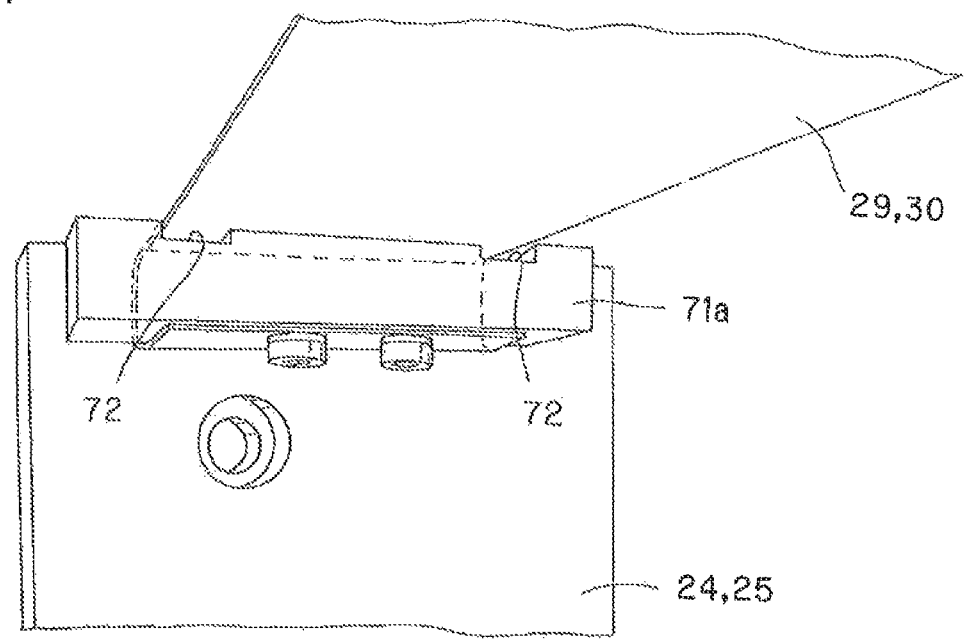
FIG. 7 is an illustration for explaining a mounting method of a dust-proof belt of a linear actuator provided with a dust-proof mechanism according to a second first embodiment of the present invention.
Figure 8:
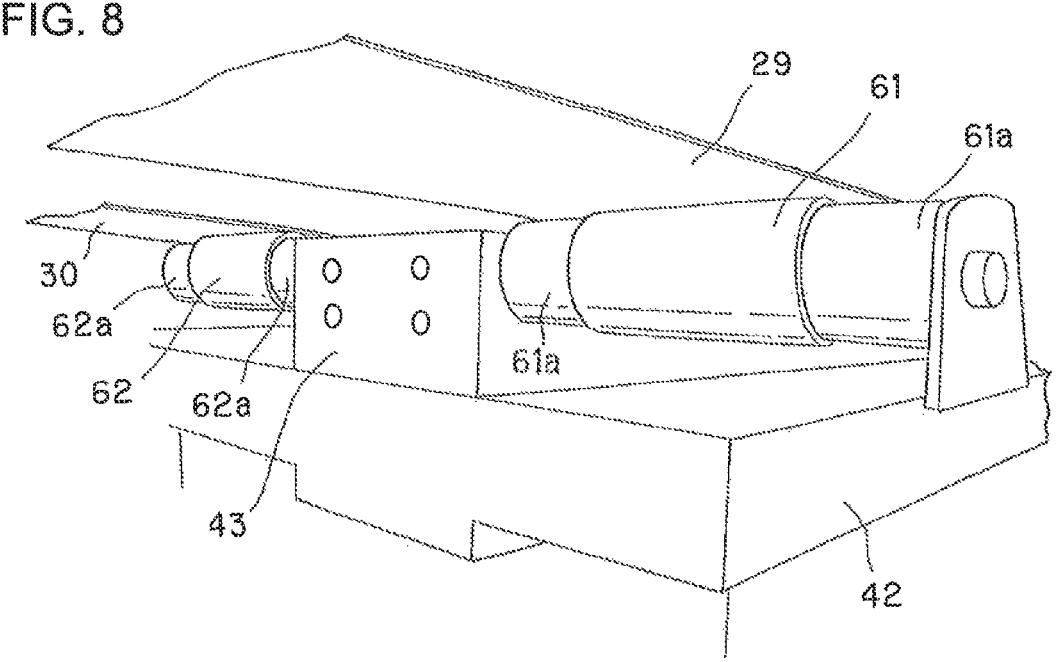
FIG. 8 is an illustration for explaining a bypass member of the linear actuator provided with the dust-proof mechanism according to the second embodiment.
Figure 9:
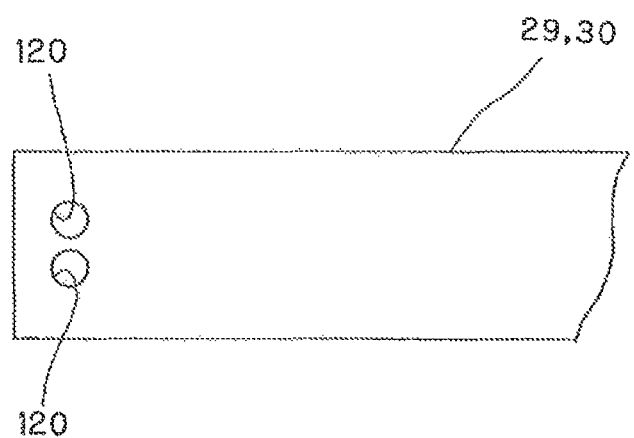
FIG. 9 is an illustration of a structure of the dust-proof belt of the linear actuator provided with the dust-proof mechanism according to the second embodiment.
Figure 10:
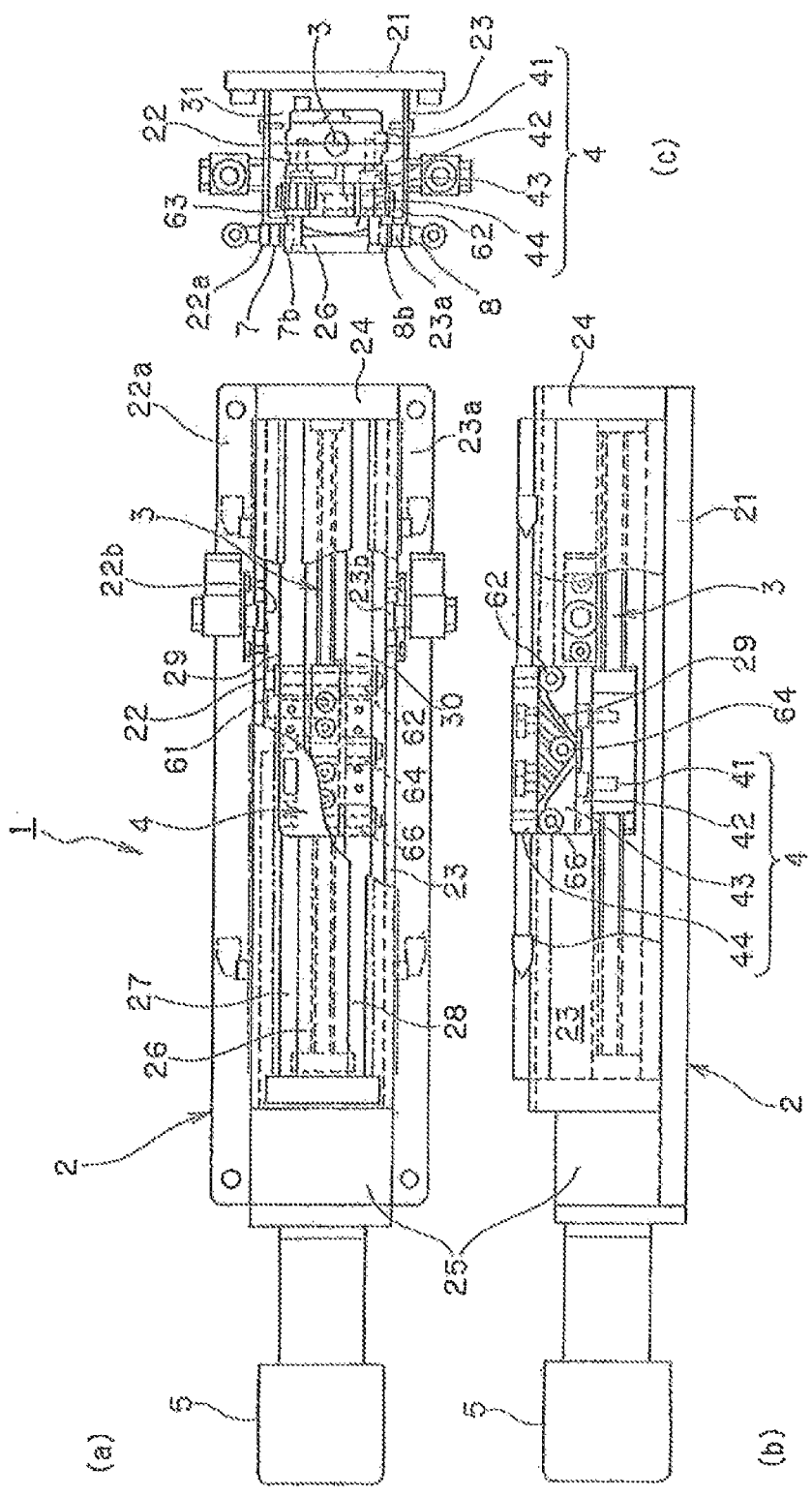
FIG. 10 represents a view for explaining a structure of a linear actuator provided with a dust-proof mechanism according to a conventional technology, in which (a) shows an upper surface side of the linear actuator provided with the dust-proof mechanism, (b) shows a front surface side thereof, and (c) shows a sectional view thereof.
Figure 11:
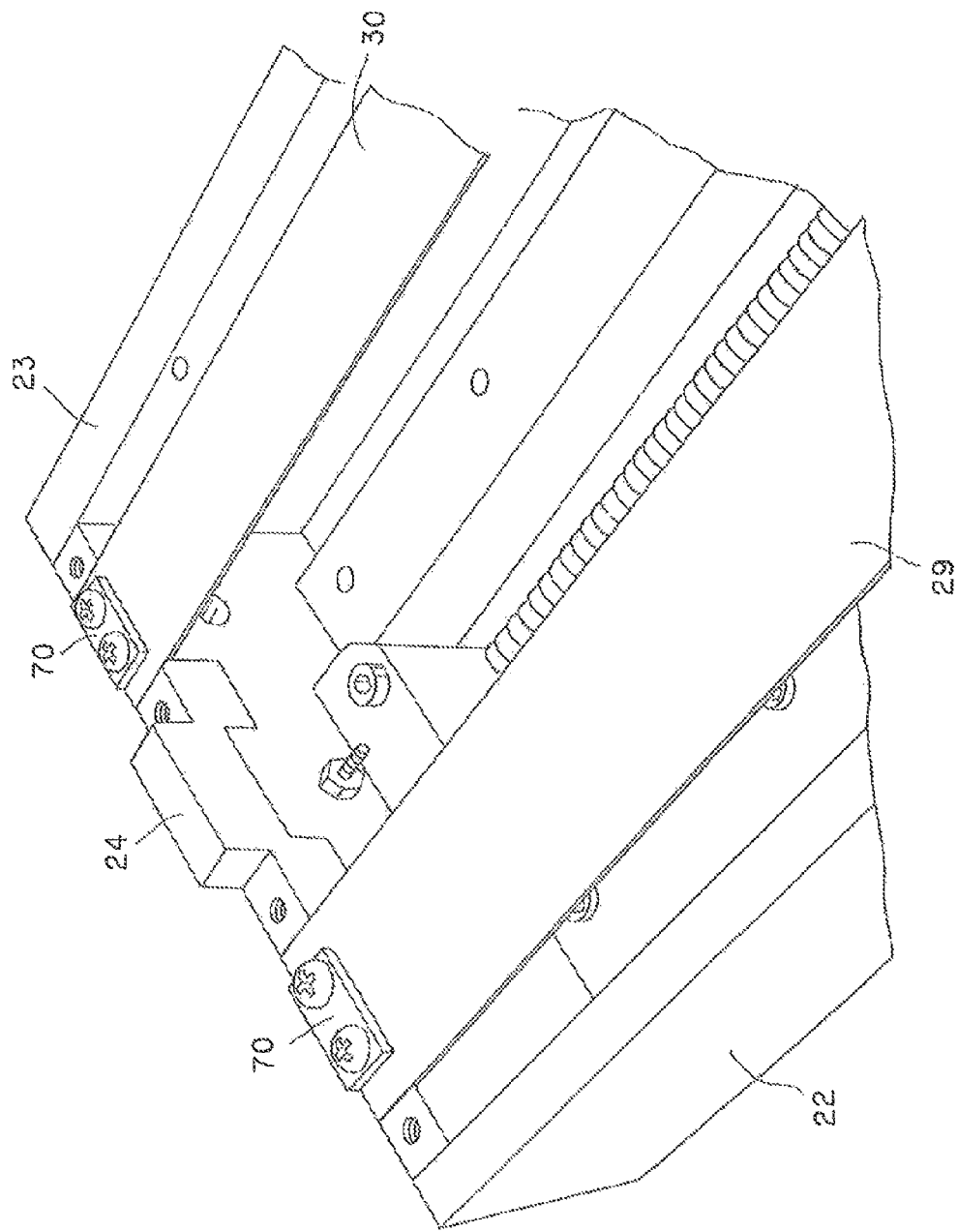
FIG. 11 is a view for explaining a dust-proof belt mounting method of the linear actuator provided with the dust-proof mechanism according to the conventional technology.

FIG. 7 is an illustration for explaining a mounting method of a dust-proof belt of a linear actuator provided with a dust-proof mechanism according to a second embodiment of the present invention, FIG. 8 is an illustration for explaining a bypass member of the linear actuator provided with the dust-proof mechanism according to the second embodiment, and FIG. 9 is an illustration of a structure of the dust-proof belt of the linear actuator provided with the dust-proof mechanism according to the second embodiment.

A linear actuator provided with a dust-proof mechanism according to the present embodiment represents an embodiment of a linear actuator provided with a dust-proof mechanism larger than that of the first embodiment mentioned hereinbefore, and more specifically, the present embodiment is one related to a linear actuator provided with a dust-proof mechanism having a dimension larger by approximately 50 mm in the width direction perpendicular to the longitudinal direction of the dust-proof belts 29 and 30.

As shown in FIG. 7, the dust-proof belts 29 and 30 of the linear actuator provided with the dust-proof mechanism according to the present embodiment are attached to the lower sides of mounting members 71a by means of bolts as like as the dust-proof belts 29 and 30 of the first embodiment, wound up around the mounting members 71a, respectively, by ¾ circle of one turn, and then attached to the housing member 2 in a manner of being sandwiched between the end blocks 24, 25 and the mounting members 71a.

Further, escape grooves 72, 72 are formed in the upper surface of each of the mounting members 71a as escape surfaces at portions near positions opposing to both end portions in the width direction of the dust-proof belts 29, 30. The upper surface mentioned above means, herein, surfaces opposing to openings 27 and 28 of the linear actuator provided with the dust-proof mechanism according to the present embodiment, which are the surfaces opposing to the dust-proof belts 29 and 30 in FIG. 7.

As described above, the formation of the escape grooves 72 to the mounting member 71a allows tension applied to the dust-proof belts 29 and 30 to escape at both the end sides thereof, thereby making slightly smaller the tension at both the end portions of the dust-proof belts 29 and 30 than that applied on the central portions thereof.

Accordingly, with the linear actuator provided with the large-sized dust-proof mechanism, as shown in FIG. 12(b), although tension becomes large at both the end portions of the dust-proof belts 29, 30, and hence, the dust-proof belts 29, 30 are bend in a downward bow-shape, by weakening the tension, the dust-proof belts 29 and 30 in the linear actuator 100 provided with the dust-proof mechanism according to the first embodiment can be stretched horizontally along the longitudinal direction of the housing member 2 as shown in FIG. 6(b), and the gap between the dust-proof belts 29, 30 and the housing member 2 can be surely closed, thereby improving the sealing performance of the linear actuator provided with the dust-proof mechanism.

As shown in FIG. 8, the linear actuator provided with the dust-proof mechanism according to the present embodiment is formed with the escape means 61a to 66a to a bypass member. Although this bypass member has a structure substantially the same as that of the linear actuator provided with the dust-proof mechanism explained in the Background Technology hereinbefore, the respective rollers 61 to 66 constituting the bypass member are all provided with the same escape means, and in FIG. 8, the rollers 61 and 62 are shown in detail, but the explanation about the other rollers 63-66 are omitted herein.

The rollers 61 and 62 are mounted to be rotatable to an intermediate plate 43 placed on the lower plate 42 constituting the movable stage, and the dust-proof belts 29 and 30 are stretched above the rollers 61 and 62. In addition, the rollers 61 and 62 are formed with escape means 61a and 62a each having a diameter smaller at both end side portions than at the central side portion in the axial direction thereof so as to provide a staged outer configuration along the axial direction.

The escape means 61a and 62a are formed at portions near the positions opposing to both the end portions of the dust-proof belts 29 and 30 as like as the escape grooves 72, 72 formed to the mounting member 71a described hereinbefore.

As described above, the formation of the escape means 61a to 66a to the rollers 61 to 66 constituting the bypass member allows tension applied to the dust-proof belts 29 and 30 to escape at both the end sides thereof, thereby making slightly smaller the tension at both the end portions of the dust-proof belts 29 and 30 than that applied on the central portions thereof.

Accordingly, with the linear actuator provided with the large-sized dust-proof mechanism, as shown in FIG. 12(b), although tension becomes large at both the end portions of the dust-proof belts 29, 30, and hence, the dust-proof belts 29, 30 are bend in a downward bow-shape, by weakening the tension, the dust-proof belts 29 and 30 in the linear actuator 100 provided with the dust-proof mechanism according to the first embodiment can be stretched horizontally along the longitudinal direction of the housing member 2 as shown in FIG. 6(b), and the gap between the dust-proof belts 29, 30 and the housing member 2 can be surely closed, thereby improving the sealing performance of the linear actuator provided with the dust-proof mechanism.

In addition, the dust-proof belts 29 and 30 of the linear actuator provided with the dust-proof mechanism according to the present embodiment are formed with the mounting holes 120, as shown in FIG. 9, on the central side in the width direction perpendicular to the longitudinal direction thereof so as to reduce the tension to be applied to the dust-proof belts 29 and 30 at both the end sides thereof. Accordingly, by weakening such tension, it becomes possible to horizontally stretch the dust-proof belts 29 and 30 along the longitudinal direction of the housing member 2, thereby surely closing the gap between the dust-proof belts 29, 30 and the housing member 2, and hence, improving the sealing performance of the linear actuator provided with the dust-proof mechanism.

Hereinabove, although preferred embodiments of the present invention were described, the technical scope of the present invention is not limited to the scope of the described embodiment. It is further possible to apply various changes or modifications to the described embodiments.

For example, in the described embodiments, although the structure in which the dust-proof belts 29, 30 are wound up around the mounting member 71 (71*a*) by ¾ circle of one turn was explained, the dust-proof belts 29, 30 may be wound up around the mounting member 71 (71*a*) by a plurality of turns in the state that the dust-proof belts 29, 30 are sandwiched between the end blocks 24, 25 and the mounting member 71 (71*a*).

Furthermore, in the described embodiment, although the structure in which the rollers 61 to 66 are formed with the staged shape to provide the escape means, the escape means is not limited to the stage-shaped structure and the escape means may be formed as a groove to a portion near the position opposing to both the end portions of the dust-proof belts 29 and 30. It will be made apparent from the appended patent claims that such modes to which the changes or modifications mentioned above are applied are included in the technical scope of the present invention.

POSSIBILITY OF INDUSTRIAL USAGE

The linear actuator provided with the dust-proof mechanism according to the present invention can appropriately adjust the tension to be applied to the dust-proof belts and surely close the gap between the dust-proof belts and the housing member to thereby improve the sealing performance of the linear actuator provided with the dust-proof mechanism.

REFERENCE NUMERALS

2—housing member, 3—ball screw, 4—movable stage, 5—drive motor, 21—horizontal substrate, 22, 23—vertical side plate, 24, 25—end block, 26—central partition plate, 27, 28—opening, 29, 30—dust-proof belt, 61, 62, 63, 64 (65), 66—roller, 61*a*, 62*a* (63*a*, 64*a*, 65*a*, 66*a*)—escape means, 71, 71*a*—mounting member, 72—escape groove.

The invention claimed is:

1. A linear actuator provided with a dust-proof mechanism, comprising:
    a ball screw;
    a movable stage provided with a ball screw nut engaged with the ball screw and configured to be reciprocally movable in an axial direction of the ball screw in accordance with a rotational motion of the ball screw;
    a housing member disposed so as to cover at least the ball screw;
    an opening portion formed in the housing member so as to extend along a moving locus of the movable stage; and
    dust-proof belts stretched inside the housing member so as to close the opening portion by being mounted to mounting members disposed both end portions of the housing member,
    wherein a bypass member for bypassing the dust-proof belts positioned at positions overlapped with the movable stage is provided for the movable stage so as to realize movement of the movable member along the opening portion while closing and sealing the opening portion by the dust-proof belts, and the dust-proof belts are wound up around the mounting member and sandwiched between the mounting member and the end portions of the housing member.

2. The linear actuator provided with the dust-proof mechanism according to claim 1, wherein the dust-proof belts are engaged with blot holes formed in the mounting member by screwing mounting bolts through mounting holes formed in the dust-proof belts, and the mounting holes are formed at portions on both end sides in a width direction perpendicular to a longitudinal direction of the dust-proof belts.

3. The linear actuator provided with the dust-proof mechanism according to claim 1, wherein the dust-proof belts are engaged with blot holes formed in the mounting member by screwing mounting bolts through mounting holes formed in the dust-proof belts, and the mounting holes are formed at portions on a central side in a width direction perpendicular to a longitudinal direction of the dust-proof belts.

4. The linear actuator provided with the dust-proof mechanism according to claim 2, wherein escape surfaces are formed at least to portions opposing to both the end portions of the mounting member in the width direction of the dust-pro of belts.

5. The linear actuator provided with the dust-proof mechanism according to claim 2, wherein the bypass member is formed with escape means at portions opposing to both the end portions of the dust-proof belts in the width direction thereof.

6. The linear actuator provided with the dust-proof mechanism according to claim 3, wherein escape surfaces are formed at least to portions opposing to both the end portions of the mounting member in the width direction of the dust-proof belts.

7. The linear actuator provided with the dust-proof mechanism according to a claim 3, wherein the bypass member is formed with escape means at portions opposing to both the end portions of the dust-proof belts in the width direction thereof.

8. The linear actuator provided with the dust-proof mechanism according to a claim 4, wherein the bypass member is formed with escape means at portions opposing to both the end portions of the dust-proof belts in the width direction thereof.

* * * * *